Figure 1:
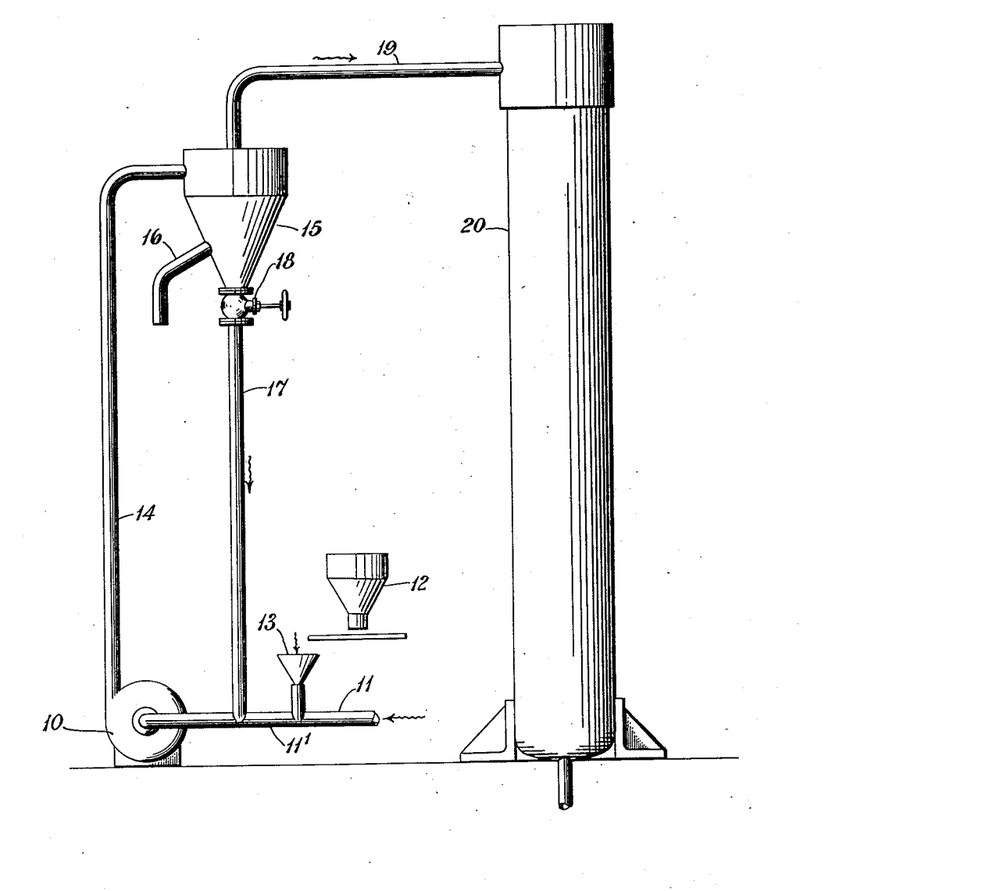

Feb. 24, 1942. C. E. BERRY 2,274,521
PRODUCTION OF FINELY DIVIDED PIGMENT SUBSTANCES
Filed July 8, 1939

Charles E. Berry, INVENTOR
BY *[signature]*
ATTORNEY

Patented Feb. 24, 1942

2,274,521

UNITED STATES PATENT OFFICE 2,274,521

PRODUCTION OF FINELY DIVIDED PIGMENT SUBSTANCES

Charles Edward Berry, Wilmington, Del., assignor to E. I. du Pont de Nemours & Company, Wilmington, Del., a corporation of Delaware Application July 8, 1939, Serial No. 283,355

18 Claims. (Cl. 209—5)

This invention relates to the production of finely-divided insoluble white or colored pigments or dyestuffs, and more particularly to methods for treating the same to improve their properties and characteristics. More specifically, it relates to the production of pigments (including extended forms thereof) of improved fineness and texture, adapted for direct use through simple mixing in coating compositions, such as enamels, flat or eggshell types of paints, without prolonged grinding in the composition vehicle as heretofore required.

It has long been recognized that pigments employable in coating compositions, such as paints or enamels, etc., must exhibit certain values in respect to fineness and texture, and must possess satisfactory color, hiding power, opacity, tinting strength, oil absorption, etc. The precipitating or other conditions which prevail during normal pigment processing or manufacture exert a pronounced influence upon the ultimate properties of the product, especially upon texture and fineness. This influence may be to such extent that the final product is detrimentally affected and becomes wholly unsuited for an intended use, as in paints and enamels from which obtainment of smooth, unbroken, flossy films is desired. Thus, during production of such prime white pigments as zinc sulfide, titanium oxide, either alone or extended, aggregates of fine particles are formed during the precipitation step. During subsequent drying or calcination, these cement together, through compacting or sintering, manifesting themselves in the final product as coarse, hard, gritty particles. When a pigment is wet ground to reduce its particle size, subsequent drying and calcination are usually resorted to. Because small amounts of water-soluble salts become unavoidably introduced into the pigment during processing, these act as fritting agents during drying or calcination to cement the pigment particles together and develop hard gritty particles in the finished product. Subsequent disintegration of the lumps formed during calcination fails to effect the desired reduction or removal of aggregates. These aggregates are very objectionable in the finished pigment because they prevent smooth, unbroken, glossy films being obtained when the pigment is incorporated in well-known coating formulations, especially enamels and high gloss finishes.

A wide variety of methods and apparatus for grinding or pulverizing pigment or coloring substances and in either wet or dry condition have been proposed. However, all involve prolonged, tedious, time-consuming operations. Aside from being commercially unattractive, they fail to yield a product suitable for direct use and through simple mix-in, in enamel or high gloss coating formulations. An improved type of such previous milling media comprises a continuous wet grinding hydroseparation system, in which the calcined pigment, after suitable grinding in a ball or pebble mill, is dispersed in aqueous media by means of a deflocculating agent. The resultant pigment fines are then separated from the coarser particles, the latter being recycled for further comminution in the system. The fines-containing overflow is then coagulated and dried. Aggregates of fine pigment particles form during such coagulation, which, during drying, cement to objectionable, hard agglomerates, thereby largely offsetting the benefits derived from the previous wet grinding. As a consequence, dry milling of the dried, wet-milled pigment must be resorted to. In instances where calcium sulfate-extended pigments are processed, wet milling cannot be resorted to because undesirable hydration of the calcium sulfate takes place. As a consequence, coarse acicular gypsum particles form in the pigment to increase its particle size to an objectionable extent. This occurs so rapidly that the beneficial effects of the grinding become lost entirely. In such instances, therefore, dry grinding or pulverizing is resorted to, which, as in the instance of dry milling a previously wet-milled and dried pigment, is effected in such types of disintegrating media as rotary hammer mills, squirrel cage disintegrators, etc., or in pulverizers such as mills of the ring roll, edge runner or pebble type. In some instances of dry milling, such as in the air-swept ball mill and ring roll type, use of classifiers for returning oversize particles for further grinding is resorted to.

Although a pigment product obtained from these dry grinding operations may be employed to a limited commercial extent, the particle size of such product is not sufficiently small, nor are grit and aggregate particles sufficiently removed as to permit use of the pigment in certain coating formulations without prolonged grinding of the pigment in the composition vehicle. Prior methods and apparatus are therefore unsuited for producing pigments possessing such uniformity of particle size, texture and fineness as to be adapted for direct incorporation, through simple mixing, in all types of coating composition. Thus, the texture and particle size of pigments so obtained will be in such unsatisfactory state that they cannot be used in enamels, flat and eggshell types of paints, or in water compositions, such as casein paints, wherein the obtainment of smooth, unbroken, glossy films is essential, without recourse to a time-consuming paint grinding step to incorporate the pigment in the vehicle, reduce its particle size, and produce an enamel or paint of satisfactory texture.

Due to the persistent retention of a considerable fraction of objectionable, gritty material (larger than substantially 10 microns in diameter and often larger than 50 microns) in the final product from prior grinding and pulverizing procedures, various classifiers, as stated, have been employed in conjunction therewith to separate fines from coarser materials. Those in common use comprise the air separator type, in which the pigment or powdered pulverulent substance is suspended in air and the resultant suspension thereafter conducted to a settling chamber to permit gravity separation of the coarser fractions from the finer particles. Another comprises the so-called cyclone separator type wherein, in addition to the action of gravity, the air suspension is subjected to a swirling, vortical motion, in order that a centrifugal effect will be generated functioning to throw the coarse particles against the internal walls of the settling chamber or cyclone for descent and removal, while the lighter fractions ascend upwardly through said chamber for withdrawal through a suitable outlet or conduit to a source of use or collection. Although useful in effecting partial separation and removal of the coarser from said finer fractions, said classifiers have not been heretofore adapted for effecting desired and relatively complete removal of coarse, gritty particles from the fines. Furthermore, in the classification of relatively fine, powdered, pulverulent substances, especially pigments such as titanium oxide, lithopone, etc., these substances tend to flocculate very seriously in suspension in air. For instance, when a pulverulent substance or pigment containing a large proportion of fine particles of the order of about 1 micron or less is suspended in a gaseous medium made up chiefly of air, these fine particles cling together in the form of clusters or flocculates. Under such conditions it obviously becomes difficult to effect separation of the coarser gritty particles, comprising firmly-cemented primary particles, from these flocculates which may have approximately the same over-all dimensions. As stated, heretofore, desired separation and complete removal of gritty aggregates from finer particles has not been attained in said classifiers.

I have discovered that these and other disadvantages in prior pigment production can be effectively remedied, and it is accordingly among the objects of this invention to provide for such a result. It is among the particular objects of my invention: to provide an improved method and means for so treating insoluble pigments and dyestuff-useful substances that their pigmentary properties, especially texture and fineness, are considerably enhanced and improved; to produce a calcined, prime white pigment product, such as titanium oxide, zinc sulfide, etc., which will be free from objectionable aggregates or gritty particles, and will possess such superior fineness and texture characteristics as to be adapted for direct use and through simple mixing in all types of coating composition vehicles, especially in enamels, flat or eggshell types of paints; to produce a titanium oxide or zinc sulfide pigment, alone or extended with barium or calcium sulfate, carbonate, etc., and more especially a calcium sulfate-extended titanium oxide pigment, the fineness and texture characteristics of which are such that for comparable paint grinding procedures, a paint film can be produced having superior fineness or texture in comparison with pigments commercially produced at present; to produce pigments which are generally acceptable to the trade for the manufacture of enamel paints, and adapted to be mixed with paint vehicles to produce enamel, flat or eggshell types of paints without resort to the paint grinding step necessary with pigments now commercially produced.

These and other objects will be apparent from the ensuing description of my invention and from the accompanying diagrammatic drawing in illustration of one method of applying my process.

In its broader aspects, the invention comprises dispersing a dry, relatively insoluble pigment or dyestuff-useful substance in a gaseous medium, and thereafter subjecting the resultant suspension to classification to recover the grit-free fines from the coarser, aggregate-containing particles.

In a more specific and preferred embodiment, the invention comprises treating a dry, finished, calcined, prime white pigment, such as titanium oxide, zinc sulfide, etc., or extended forms of the same, with a polar non-polar compound adapted to promote suitable dispersion of said pigment in a gaseous medium, suspending said treated pigment in said medium, and subjecting the resultant suspension to classification to recover its grit-free fines content.

Prior to undertaking a more detailed description of the invention, a brief explanation of the terms "texture" and "fineness," to be used herein, will be given, together with methods for ascertaining the values thereof. Texture and fineness may be defined as the hardness, shape and size of the individual pigment particles and which directly affect the type of paint or coating composition film obtainable when a pigment is employed in a particular formulation, i. e., whether such film will be rough or smooth in character. The fineness of pigments may be practically determined by a well-known texture test, such as described on pages 511 and 512 of "Physical and Chemical Examination of Paints, Varnishes, Lacquers and Colors" by H. A. Gardner (8th edition), January 1937. The directions for this test are as follows:

The pigment is made into a paste by either of the following methods:

A. Using a spatula with a flexible blade (1½ by 6½ inches), mix the pigment with a quick drying varnish of fairly good wetting properties. The amount of pigment and varnish varies with the nature of the pigment. For lithopone, use about 1.5 g. of each. Give the paste 50 double rubs, using strokes about 12 inches long. Collect and re-spread the paste after each 10 rubs.

B. Make a preliminary mix of the pigment and quick drying varnish. Pass this paste once through a roll mill with the rolls set at 0.0015 inch clearance. Steel strips are used for setting the mill and are withdrawn before grinding. Reduce the ground paste to paint consistency with additional vehicle, and allow to stand overnight.

The paints prepared by the above methods are then spread in films as follows:

A. Make a wedge-shaped film on glass by drawing a 3½ inch doctor blade, one end of which is resting on a steel strip 0.003 inch thick, over the paint.

B. Make a uniform film, using 0.0015 inch steel strips as guides for the doctor blade.

Allow the films to dry in a dust-free atmosphere and then examine them under illumination at grazing incidence, using a high intensity microscope lamp if available. Grading is most conveniently done against standards and is based on the size and number of coarse particles projecting from the film. The standards which I use range from "1" at the bottom of the scale, representing a film with extremely coarse particles and sand-like in appearance, to 18 at the top of the scale, representing a film with practically no perceptible coarse particles and of smooth, glass-like appearance. The intermediate standards represent gradual and evenly-spaced graduations from one extreme to the other, a difference of one point on the scale being material.

With the aid of the test A and by observing the thin portion of the wedge film, an idea of the number of particles of the order of 10 microns is obtained. By means of the test B and observation of the number and size of particles protruding above the surface of the film, an idea of the quantity of hard grit particles from about 10 to above a size of 40 microns is obtained.

Having explained the terms which I shall use herein to more definitely describe my invention, a detailed description of said invention will now be undertaken.

Although generally adaptable for the treatment of all types of relatively insoluble pigments and dyestuff materials, the invention, as indicated, is particularly effective in the manufacture of prime white pigments, especially calcium sulfate-containing titanium oxide pigments. Accordingly, in description, the invention will be illustrated in connection with such particular and preferred embodiment.

In the manufacture of calcium sulfate-extended titanium oxide pigments, admixture of the titanium oxide with calcium sulfate (preferably precipitated anhydrite) is usually effected in wet slurry and after wet grinding of the titanium oxide to relatively fine particle size (2 microns or less). The mixture is then filtered, dried, calcined and ground. Wet grinding and hydroseparation to break up lumps and reduce aggregates formed during drying and calcination cannot be resorted to in these instances, because, as stated, hydration of the calcium sulfate with consequent increase in pigment particle size takes place. Dry grinding or pulverization in hammer, roller or similar types of mills therefore must be resorted to. Thereafter, an attempt is made, through classification, to separate coarse from finer pigment particles. As stated, due to pigment flocculation, desired and complete removal of coarse aggregates has not been previously accomplished.

In accordance with my invention, a grit or aggregate-free pigment is obtained by subjecting a pigment substance to classification while the same is in gaseous suspension by treating said pigment, prior to such classification, with a known, relatively small amount of a dispersing or deflocculating agent, comprising an organic polar non-polar compound which, preferably, is substantially fluid at the prevailing classification temperatures. The polar non-polar compound, or mixtures thereof, as used, is preferably of such character that the same polarizes as a film on the pigment, forming a relatively thin coating on the smallest pigment particles to effectively induce dispersion of the pigment prior to classification and prevent its cementation or flocculation during such classification.

By "polar non-polar compounds," I refer to organic compounds or mixtures thereof which are either water-soluble, water-emulsive, or water-immiscible in character; in which substantially one extremity of every molecule is of an ionizing character, the other extremity being non-ionizing and substantially oil-miscible; to compounds having the general formula wherein R is an aliphatic or cyclic radical having at least 5 carbon atoms and X is hydrogen or a metal; said compounds being anion-active; or cation-active, aliphatic surface-active compounds yielding positive radicals having an alkyl or substituted alkyl chain containing at least 8 carbon atoms.

Those polar non-polar compounds preferably useful in the invention comprise those which are relatively water-immiscible, such as the higher fatty acids and alcohols, naphthenates or salts of aromatic acids, including oleic, stearic, palmitic, lauric, myristic, margaric, benzoic, naphthenic, etc. acids, or higher alcohols such as propyl, butyl, amyl, octyl, nonyl, decyl, stearyl, cetyl, benzyl, etc. Similarly, those which are water-emulsive in character, such as metallic naphthenates (aluminum, calcium, zinc, etc.) or various types of fatty alcohols may also be employed, as may water-soluble polar non-polar compounds, including the alkali metal salts, such as those of sodium or potassium, of the fatty acids mentioned, particularly sodium oleate, sodium stearate, sodium palmitate, sodium laurate, sodium resinate, sodium linoleate, and the like, water-soluble salts of alginic acid or sulfonated fatty acids or sulfonation products of oils, such as sulfonated olive oil, sulfonated sperm oil, sulfonated petroleum and the like; or the water-soluble salts of naphthenic acid, such as sodium naphthenate, or sulfated higher alcohols, such as sulfated cocoanut oil alcohols. Included among cation-active materials useful in the invention are compounds adapted to yield positive radicals having at least 1 aliphatic alkyl or alkoxy alkyl group, with or without substituents, which contains at least 8 carbon atoms. The first species of this general class of agents consists of salts of organic bases which bases are characterized by having at least one basic nitrogen containing residue and at least one long-chain aliphatic residue. The first species can be divided into two groups. As an example of the first of these groups, I may use water-solubilized long-chain amine compounds of either primary, secondary, or tertiary character which may be solubilized by methods including salt formation with water-soluble inorganic acids or by formation of hydroxy or carboxy derivatives of these long-chain amines. As specific representatives of long-chain amines that can be readily solubilized by addition of acids like sulfuric, hydrochloric, etc., I may utilize dodecyl amine, hexadecyl amine, octadecyl amine, and the corresponding secondary or tertiary alkyl derivatives of the same, i. e., dodecyl dimethyl amine, didodecyl amine, octadecyl diethyl amine, etc. As representatives of long-chain amines partially or completely solubilized by relatively water polar groups, such as hydroxy or carboxy derivatives, I may utilize such materials as didodecyl amine ethanol, dodecyl diglycerol amine, dodecyl methylglucamine, esters formed from long-chain alcohols and amino acids, esters formed from fatty acids and hydroxy amines, and by ester interchange with fatty oils and hydroxy amines, etc. A second group of the first species of the above nitrogen-containing species consists of quaternary ammonium compounds containing at least one long alkyl or alkoxy alkyl chain containing 8 or more carbons. Representative compounds of this class includes octadecyl trimethyl ammonium bromide, hexadecyl trimethyl ammonium bromide, dodecyl pyridinium sulfate, dodecyl pyridinium bromide, dodecyl pyridinium chloride, hexadecyl pyridinium bromide, octadecyl pyridinium bromide, octadecyl oxymethyl pyridinium chloride, octadecyl choline chloride, etc. Long-chain betaines such as octadecyl betaine are useful for my purpose, being related to this type of species. A second species of the class operative in the present invention consists of water-soluble salts of organic compounds which are characterized by having at least one ternary sulfonium residue to which is attached at least one alkyl chain containing 8 or more carbons. As specific representatives of this species including compounds in which the sulfur atom has a positive valence of four are to be included: Methyl benzyl stearyl sulfonium methyl sulfate, lauryl dimethyl sulfonium methyl sulfate, etc. A third species of the class operative in the present invention includes phosphorous compounds similar in structure to the nitrogen-containing compounds described under the first species. They include water-soluble salts of organic compounds which are characterized by having at least one phosphonium residue to which is attached at least one aliphatic group containing an aliphatic residue of at least 8 carbon atoms.

Polar non-polar compounds outstandingly beneficial and useful in the invention in procuring optimum results, comprise those which are relatively water-immiscible. Specifically, these include: cocoanut oil fatty acid (known commercially as "Wecoline AA," comprising a top fraction obtained by the distillation of cocoanut oil fatty acids, a chief component of which is lauric acid); "Lorol" alcohol, comprising a mixture of higher boiling alcohols with about 6 to 18 carbon atoms and usually from 8 to 16 carbon atoms, obtained by processing cocoanut oil; oleic, stearic, benzoic, and/or naphthenic acids, as well as benzyl amine. Water-soluble polar non-polar compounds are also advantageously useful, especially where production is desired of an improved water-dispersible type of pigment substance. Thus, if production is sought of water-dispersible titanium oxide, ZnS, lithopone, or similar prime pigments, they may be suitably treated, after calcination, with water-soluble polar non-polar compounds adapted to impart water-dispersible properties thereto, and then subjected to treatment in accordance with my invention. Compounds especially useful for the purpose include monobutylamine, triethanolamine, and the dioctyl ester of sodium sulfosuccinate.

The amount of polar non-polar agent required for use will be found to be relatively small, but, preferably, is sufficient to completely cover the surface of the pigment particles being treated with a film of agent substantially 1 molecule thick. By such coating of each pigment particle with a monomolecular layer of agent, their electric charges become uniformly distributed and localized on the periphery of the particle. As a consequence, all particles have an electric charge of the same sign (positive or negative) and neutralization of particle charges through polarization advantageously follows. All particles, possessing a charge of the same sign, advantageously repel each other, to inhibit undesired pigment flocculation or formation of agglomerates which would impede or prevent the dispersion required for efficient classification. The amount of agent necessary for providing this result can be easily determined through known methods of calculation, e. g., from the specific surface of the pigment (surface per unit weight) and knowledge of the mono-molecular area covered per unit weight of treating agent; or, may be arrived at, if desired, by titration. Thus, in calculating the amount, it can be shown (I. Langmuir's article, Journal American Chemical Society 39, 1848–1906 (1917)) that polar non-polar compounds, such as saturated and unsaturated fatty acids and alcohols, cover a square meter of surface with the use of 0.0011 to 0.0016 gram, depending on the constitution of the agent; and in Green's article (Journal, Franklin Institute 192, 637–666 (1921)) a method is described for determining the average particle size of a pulverulent material or pigment substance and for calculating its specific surface by the formula:

$$S = \frac{6}{pD}$$

where S is the specific surface in square meters per gram of powdered material, $p$ is the density of the material in grams per cubic centimeter, D is the diameter of the particle in microns. As an example, take a powder having $D=0.5$ micron and $p=4.2$ and one obtains:

$$S = \frac{6}{4.2 \times 0.5} = 2.9 \text{ sq. meters/gm.}$$

Thus, the percentage of agent to be added to this material varies between 0.32 ($100 \times 0.0011 \times 2.9$) and 0.45 ($100 \times 0.0016 \times 2.9$), depending on the agent used.

If titration should be resorted to for determining the necessary amount of treating agent, a conveniently useful type of method comprises that disclosed in the article "Determination of relative fineness of zinc oxides by surface wetting" by H. J. Mueller, Gummi-Ztg. 52, 995 (1938) September.

In adapting the invention, I have found that the amount of treating agent to be incorporated in the pigment prior to classification may range from about 0.03% to about 4.5% and preferably within from about 0.15% to about 2.2%, with optimum benefits obtaining in the invention when the amounts involved range from about 0.20 to about 0.9%.

In practical application, the polar non-polar agent may be intimately associated with the pigment while in either atomized, liquid or solid condition. Such incorporation may also be effected by resort to any desired method or means and at either room or elevated temperatures, depending upon the type of agent, or at any stage of pigment manufacture subsequent to calcination. Thus, for instance, the required amount of agent may be admixed with the pigment by direct addition thereto as by spraying or otherwise blending the same wtih the pigment as it discharges from the calciner for passage to a grinding operation. In this manner, not only is a more thorough and even distribution of the agent throughout the pigment advantageously effected during grinding, but the presence of the agent in the pigment materially aids and assists in the grinding operation; or, alternatively, the pigment and agent may be separately or concurrently introduced into a suitable mixing zone or vessel and intimate mixture effected therein by stirring or agitation. Similarly, other modes of uniformly distributing the agent throughout the pigment may be employed, such as introducing the agent into the pigment while in finely-divided form by means of an atomizer, or continuously passing vaporized or atomized suspensions of agent through a mixing zone countercurrent to a gaseous suspension of pigment. As an example of one convenient method for effecting admixture of a specific pigment and useful type of treating agent, the following is illustrative:

50 pounds of a finished, calcium sulfate-extended titanium oxide pigment which had previously been ground in a ring-roll mill, were introduced into a 55-gallon drum, placed on rolls. Rotation of the drum at a speed of about 30 R. P. M. was thereupon effected. Small amounts of oleic acid were intermittently sprayed through a small, centrally located opening in the cover head of said drum, such spraying being continued until about 0.5% of treating agent had been added to the pigment. On conclusion of agent addition, rotation of the drum was continued for a relatively short period in order to insure a thorough mixing of the pigment and acid.

After the polar non-polar agent has been suitably admixed with the pigment, the product may be suitably dispersed in gaseous media preparatory to classification. As in the instance of agent incorporation, such dispersion and classification may be conducted at either room or elevated temperatures. In effecting dispersion, a variety of gaseous agents may be used, although preferably a relatively inert gas, such as air, or dry, superheated steam, combustion gases, etc., is resorted to. Since steam and combustion products are at elevated temperatures, they advantageously assist, in the instance of many pigments, in dispersion, deflocculation and separation and their use will therefore be found preferable in such instances. Whatever type or character of gas is used, obviously it may be suitably heated prior to use, if desired, in order that the beneficial effects alluded to may be had.

In effecting dispersion of the pigment in the gaseous agent, any conventional dispersing apparatus may be employed. In the accompanying drawing, particularly Fig. 1, which diagrammatically illustrates a process in which the product is first dispersed and then classified, the dispersing machine 10 preferably consists of the type provided with a high speed blower or impeller, the rotor or fan element (not shown) of which is enclosed within a suitable casing (also not shown). Air or other gas may be drawn into the machine 10 by said impeller through the conduit 11, and contain in suspension material to be classified; said material being fed from the supply hopper 12 to the associated table feeder 13, communicating with the conduit 11', which leads to the inlet of the dispersing machine 10, the arrangement being such that gases and material are fed to said blower at controlled, uniform and predetermined rates. After subjecting said material to treatment in said blower and suitably dispersing the same in the gas, the resultant dispersion is discharged from the machine 10, via the conduit 14, to a suitable separator or classifier 15, preferably of the cyclone or centrifugal type. The classifier 15 functions to separate the dispersed fines from the coarser particles, and, in general, to precipitate or separate particles from a current of air in which they are transported, and from each other, through a whirling cyclonic movement or through centrifugal action, such separation function being well-known and understood to the art. Included among useful types of separators and centrifugal classifiers are those described in United States Patents Nos. 452,580, 405,674, 1,457,100, 1,785,918, 1,846,209, or 1,996,076. The coarse, gritty pigment particles (above 5–10 microns in diameter) which are separated within the classifier 15 are withdrawn, through reject outlet 16, from said classifier to a source of collection or discharge; or, if desired, may be returned to the dispersing machine 10, together with an intermediate fines-containing fraction, for retreatment and classification, via conduit 17 controlled by a discharge valve 18, communicating with conduit 11' leading to the inlet of the dispersing machine 10. If desired, and especially in instances where the pigment is relatively sticky in character and tends to adhere to the internal walls of the separator 15, suitable scraper paddles or blades (not shown) may be employed, thereby assisting in effecting desired removal of separated materials. The gaseous suspension of separated pigment fines, completely freed of objectionable, coarse, gritty aggregates or particles, is conducted from said separator 15 via a suitable outlet and conduit 19 to a collecting zone 20, such as a bag or stocking collector made of tubular, open-ended fabric, adapted to remove and collect the pigment fines from the suspending gas and exhaust the latter to the atmosphere or recycle the same for reuse in the system.

To comparatively demonstrate the effect which the use of polar non-polar agents in accordance with my invention has on the production rate and fineness of a calcium sulfate-containing titanium oxide pigment dispersed and classified in a system such as described, as contrasted with treatment of the same pigment with other types of agents and using the texture tests described above, the following example is given:

EXAMPLE I

| Treatment | Pigment rate, lbs./hr. | Rejects, percent of feed material | Texture of fines | | 325 mesh screen residue in percent | |
|---|---|---|---|---|---|---|
| | | | A | B | Fines | Rejects |
| 0.6% Wecoline AA | 110 | 0.173 | 16+ | 15 | 0.000 | 3.36 |
| Do | 211 | 0.121 | 17+ | 15 | 0.001 | 3.72 |
| 0.5% stearic acid | 120 | 0.153 | 17 | 15 | 0.000 | 4.31 |
| 0.6% Lorol | 110 | 0.084 | 17 | 14+ | 0.000 | 5.44 |
| Do | 201 | 0.112 | 14+ | 16 | 0.000 | 4.84 |
| 0.6% Nujol | 100 | 0.075 | 14 | 10 | 0.000 | 0.96 |
| Do | 205 | 0.32 | 12 | 6+ | 0.004 | 0.38 |
| 0.6% kerosene | 107 | 0.52 | 13+ | 6+ | 0.010 | 0.34 |
| Do | 206 | 0.8 | 12+ | 7+ | 0.006 | 0.18 |
| None | 107 | 0.7 | 13+ | 9+ | 0.002 | 0.17 |
| Treated feed control | | | 11 | 3+ | .009 | |

As will be noted from the above, neutral non-polar agents, such as Nujol and kerosene failed to promote any dispersion.

To illustrate the effect which my treatment has upon pigments other than calcium sulfate-extended titanium oxide, treated to promote dispersion and classified in a system such as that described, the ensuing examples and texture determinations are given:

to promote dispersion, due to material collecting on the walls of the classifier and gradually caking to such an extent that the apparatus could not be operated.

The 325 mesh screen residue data of the foregoing examples, as well as that in certain of

EXAMPLE II

*Lithopone treated in wet slurry form with a .5% sodium soap of cottonseed oil fatty acids*

| Pigment rate, lbs./hr. | Rejects, percent of feed material | Texture | | | | 325 mesh screen residue in percent | |
|---|---|---|---|---|---|---|---|
| | | A | | B | | | |
| | | Fines | Rejects | Fines | Rejects | Fines | Rejects |
| 16 | 0.02 | 17 | -------- | 16+ | -------- | .001 | 15.2 |
| 32 | 0.01 | 16 | -------- | 17 | -------- | .001 | -------- |
| 79 | 0.02 | 16+ | -------- | 16 | -------- | .001 | 26.2 |
| 124 | 0.03 | 16 | -------- | 17 | -------- | .002 | 22.6 |
| 159 | 0.09 | 16 | 8 | 17 | -------- | .009 | 15.7 |
| 239 | 0.15 | 17 | 13 | 17 | -------- | .004 | 10.5 |
| 323 | 0.35 | 16+ | 12 | 16 | -------- | .002 | 10.8 |
| 484 | 0.04 | 16 | 8 | 15+ | -------- | .003 | 12.0 |
| 332 | 0.01 | 16 | -------- | 16 | -------- | .003 | 20.4 |
| 402 | 0.01 | 15+ | -------- | 15+ | -------- | .001 | 52.7 |
| 418 | 0.04 | 15 | -------- | 15 | -------- | .001 | 11.8 |
| 411 | 0.02 | 15 | -------- | 16+ | -------- | .002 | 10.8 |
| (*) | (*) | (*) | (*) | (*) | (*) | (*) | (*) |
| Treated feed (control) | -------- | 13 | -------- | 5+ | -------- | .08 | |

*Untreated—could not be classified.

EXAMPLE III

*Lithopone treated in dry state with 0.5% Wecoline AA*

| Pigment rate, lbs./hr. | Rejects, percent of feed material | Texture | | | | 325 mesh screen residue in percent | |
|---|---|---|---|---|---|---|---|
| | | A | | B | | | |
| | | Fines | Rejects | Fines | Rejects | Fines | Rejects |
| 18 | 0.2 | 17 | 8 | 17 | -------- | .002 | 11.6 |
| 98 | 1.0 | 17 | 13 | 17 | -------- | .002 | 10.1 |
| 146 | 0.1 | 16+ | 8 | 17 | -------- | .001 | 18.6 |
| 193 | 0.1 | 16+ | 8 | 15 | -------- | .002 | 23.8 |
| 315 | 0.1 | 14+ | 8 | 14 | -------- | .004 | 23.8 |
| (*) | (*) | (*) | (*) | (*) | (*) | (*) | (*) |
| Treated feed (control) | -------- | 13+ | -------- | 5 | -------- | .08 | |

*Untreated—could not be classified.

EXAMPLE IV

*Titanium dioxide treated with 0.5% oleic acid*

| Pigment rate, lbs./hr. | Rejects, percent of feed material | Texture | | | | 325 mesh screen residue in percent | |
|---|---|---|---|---|---|---|---|
| | | A | | B | | | |
| | | Fines | Rejects | Fines | Rejects | Fines | Rejects |
| 19 | 0.1 | 17 | 11 | 16 | -------- | .001 | .68 |
| 39 | 0.6 | 17 | 12 | 16 | -------- | .001 | .21 |
| 80 | -------- | 16+ | -------- | 16 | -------- | .001 | -------- |
| 199 | 0.3 | 16 | 11 | 11 | -------- | .001 | .92 |
| (*) | (*) | (*) | (*) | (*) | (*) | (*) | (*) |
| Treated feed control | -------- | 14+ | -------- | 8 | -------- | .006 | |

*Untreated—could not be classified.

As will be noted from the above, treatment of pigments to disperse the same prior to classification exerts a marked effect upon the classification efficiency. Further, in the instance of pigments such as lithopone and titanium oxide, these could not be classified without treatment the succeeding examples, was determined by a method similar to that described on pages 488–493 of Physical and Chemical Examination of Paints, Varnishes, Lacquers & Colors, by H. A. Gardner (8th edition), January, 1937. In making the screen tests, mineral thinner of the quality employed in paints is used, containing, preferably, a small amount, say, a 1% solution, of sulfonated olive oil as a dispersing agent.

To demonstrate the effectiveness which pigment treatment in accordance with my invention has in promoting dispersion, as well as to illustrate the resultant increase in production of aggregate-free fines from a classifier in a system such as described above, the following comparative table is given, the pigment treated comprising a finished, calcium sulfate-extended titanium oxide pigment, previously ground in a ring roll mill:

EXAMPLE V

*Effect of treatment to aid dispersion on production rate of fine material from the classifier*

Gas (air) rate=900 C. F. M.
Speed of dispersing machine=3,750 R. P. M.

| Treatment | Feed rate, lbs./hr. | Fine product, percent of feed material | Production rate for fine product, lbs./hr. | Texture A | |
|---|---|---|---|---|---|
| | | | | Fines | Coarse |
| 0.5% oleic acid | 68 | 56.5 | 38.6 | 18 | |
| Do | 240 | 35 | 84.0 | 18 | 15 |
| Do | 350 | 22.7 | 79.5 | 18 | 15+ |
| Do | 645 | 16 | 102.0 | 17 | |
| 0.5% stearic acid | 71 | 59.3 | 40.5 | 17 | 14 |
| Do | 216 | 31.5 | 76.6 | 18 | 15 |
| Do | 367 | 24 | 84.4 | 17 | 15+ |
| None | 46 | 28.5 | 13.2 | 15 | 11 |
| Do | 137 | 16.2 | 22.2 | 13 | 13 |
| Do | 222 | 13.5 | 30.0 | 14+ | 11+ |
| Do | 284 | 10.0 | 28.2 | 14 | 11+ |
| Do | 396 | 7.0 | 27.5 | 13 | 11+ |
| Do | 572 | 4.9 | 28.3 | 13 | 11 |

From the preceding table, it will be evident that as a result of treatment to promote dispersion, the production rate of ultimate fine product becomes increased from substantially 25 to 100 pounds/hour or approximately 300%.

To demonstrate the advantages afforded by pigment treatment in accordance with the present invention to promote dispersion when employing a unitary dispersing machine and classifier, as distinguished from the separate dispersing machine and classifier illustrated, the following table is given:

EXAMPLE VI

*Effect of treatment to promote dispersion*

Gas (air) rate=450 C. F. M.
Speed of dispersing machine=3,600 R. P. M.

| Treatment | Pigment rate, lbs./hr. | Rejects, percent of feed material | Texture | | | | 325 mesh screen residue in percent | |
|---|---|---|---|---|---|---|---|---|
| | | | A | | B | | | |
| | | | Fines | Rejects | Fines | Rejects | Fines | Rejects |
| .5% oleic acid | 83 | 0.02 | 17 | 6 | 17 | | .002 | 29.3 |
| Do | 135 | 0.03 | 17 | 4 | | | .003 | 15.0 |
| Do | 194 | 0.04 | 16 | 4 | 17 | | .004 | 8.0 |
| Do | 211 | 0.01 | 16 | 6 | | | .004 | 11.4 |
| Do | 353 | 0.12 | 15 | 6 | 15+ | | .004 | 4.0 |
| Do | 438 | 0.08 | 14+ | 6 | 13 | | .006 | 3.4 |
| Do | 30 | 0.22 | 16+ | | 17 | | .009 | 0.6 |
| Untreated | 93 | 0.58 | 15 | | 13 | | .010 | 0.7 |
| Do | 133 | 0.17 | 14 | | 13 | | | |

From the data in the above Table VI, it will be seen that for a given fineness of product, the production rates are from about 4 to 5 times as great, due to pigment treatment to promote dispersion, as compared to processing of the untreated material. A further advantage afforded by treatment to promote dispersion is that the amount of by-product reject material becomes materially lowered.

To demonstrate the high and efficient manner of removal of the coarser, aggregate-containing particles of pigment, retention and recovery of the very finest material, the ensuing table is given, the calcium sulfate-extended TiO$_2$ pigment comprising the same type as illustrated in Example V:

EXAMPLE VII

*Operation of classification system with 0.5% oleic acid treated calcium sulphate containing titanium dioxide pigment*

Gas (air) rate=900 C. F. M.
Speed of dispersing machine=3,900 R. P. M.

| Pigment rate, lbs./hr. | Rejects, percent of feed material | Texture of fines | | 325 mesh screen residue in percent | |
|---|---|---|---|---|---|
| | | A | B | Fines | Rejects |
| 43 | 0.7 | 16+ | 16+ | .001 | .440 |
| 74 | 0.2 | 16 | 15+ | .001 | .278 |
| 110 | 0.5 | 16 | 15 | .001 | .213 |
| 129 | 0.4 | 16 | 15 | .001 | .164 |
| 168 | 1.0 | 16 | 14 | .000 | .203 |
| Feed | | 11 | 4 | .030 | |

From the data in the foregoing Table VII, wherein the 325 mesh screen residue is a measure of objectionable coarse material and the rejects fraction is a mixture of coarse and fine material, it will be seen, in comparison with the feed material, the rejects contain from about 5 to 15 times as much objectionably coarse particles.

I have also determined that the speed of the dispersing machine bears directly on the rate of fine material production from a classifier, and to demonstrate such effect the following table is given:

EXAMPLE VIII

*Effect of speed of dispersing machine on classifier production rate of fine material*

Gas (air) rate=500 C. F. M.

| Speed of dispersing machine R. P. M. | Feed rate, lbs./hr. | Fine product, percent of feed material | Production rate of fine lbs./hr. | Texture A | |
|---|---|---|---|---|---|
| | | | | Fines | Coarse |
| 3,400 | 63 | 22 | 14 | 15+ | 12+ |
| 3,400 | 120 | 13 | 15 | 16 | 12 |
| 3,400 | 230 | 7 | 16 | 16 | 13 |
| 3,400 | 345 | 4.5 | 15.5 | 16 | 13+ |
| 1,700 | 84 | 8.3 | 7.0 | 16+ | 11+ |
| 1,700 | 216 | 4.2 | 9.0 | 15 | 12 |
| 1,700 | 350 | 2.2 | 7.5 | 14 | 11 |

From this Table VIII it will be evident that for a given feed rate the production rate becomes doubled by doubling the speed of the dispersing machine.

Although exemplified in certain particular embodiments, it will be obvious that my invention is not limited thereto and that variance therefrom may be had without departing from its underlying principles. As has been indicated, though use has been had of separate dispersing and classifying units, obviously dispersion and classification may take place in a single unit adapted to combine both functions, suitable apparatus therefor being well-known to the art. Again, the method of treatment to promote dispersion is not limited to any specific place of application of the agent, since it may be added to the pigment to be classified while in the dry state before or after grinding or in the wet condition during the manufacturing operation; or admixture or incorporation of the agent in the pigment may be effected concurrent with dispersion in the gaseous medium. Likewise, the method of dispersing in the gas is not limited to the use of any specific device, dispersing machines of the rotating type having been mentioned only for purposes of illustration. Obviously, various types of these machines and in great modification may be employed.

Again, while in certain preferred embodiments treatment of certain types of pigment substances has been alluded to, the invention obviously involves the treatment of all types of pigment or dyestuff-useful substances and to obtain a product of such fineness and texture properties as to be readily adapted for direct use and incorporation in well-known coating composition vehicles. Thus, in addition to treating such prime white pigments as titanium oxide, zinc sulfide, or extended forms of the same, other types of pigments may be similarly treated, examples of which include the various metal titanates, zinc oxide, leaded zinc oxide, antimony oxide, white lead, etc. Similarly, various inorganic or organic colored pigment materials, either alone or extended, may be subjected to treatment in the invention, examples of which include ultramarine blue, zinc or chrome yellows, chrome greens, iron blues, earth colors such as iron oxides, carbon black, etc., or may be applied to the various well-known insoluble organic dyestuffs, such as para and toluidine reds or precipitated azo pigments, such as lithol reds, etc.

By a practice of my invention, finely-divided pigment-useful substances, and particularly previously calcined white pigments, can be advantageously deflocculated or dispersed so that classification to remove gritty aggregates can be accomplished in a more economical manner. In some instances, where the nature of the material is such that classification has been impossible heretofore, resort to my invention affords advantageous classification treatment. As indicated, the invention has particular applicability to the treatment of calcined, calcium sulfate-extended titanium oxide pigments, which, as stated, are subject to undesirable chemical change in structure when subjected to contact with water, whereby they cannot be wet ground and classified to obtain a fine particle size. When such pigments have been dry ground in presently available commercial mills, the product has proved to be of such poor texture that it is unsuited for the production of enamel paints when made in accordance with standard enamel paint grinding procedure. When treated in accordance with my novel method, the resultant pigment exhibits such texture characteristics that a satisfactory enamel paint can be readily manufactured, and the paint grinding operation can be readily dispensed with since simple mixing of the pigment and vehicle produces a most satisfactory type of enamel paint. Also, in the manufacture of flat and eggshell paints of calcium sulfate-containing titanium oxide pigments, it has been necessary to grind the pigment and vehicle together in pebble mills, roll mills, or stone mills to reduce pigment particle size. When treated in accordance with my invention, the resultant pigment exhibits such texture or fineness that such paint grinding can be entirely dispensed with.

The fineness or pigment structure obtainable through a practice of the process of my invention cannot be obtained in hammer mills and ring roll mills of commercial design without resorting to impractical and uneconomical low feed rates or multiple grinding operations. By the instant invention resort to such types of procedure may be entirely avoided and a practical and economical means is afforded for producing a finely-divided material possessed of satisfactory texture and fineness characteristics.

I claim as my invention:

1. A process for producing a fine-textured pigment product adapted for direct use as a mix-in pigment in coating compositions, said pigment being substantially free of particles of 5 microns or greater size and substantially all of the particles of which pass through a 325 mesh screen, comprising intimately associating a minor amount of a polar non-polar compound with a previously ground, finished form of said pigment, dispersing the resultantly treated pigment in a gaseous medium, and thence subjecting the resultant dispersion to classification treatment to remove the coarser pigment particles from the finer fractions thereof, and recovering said finer fractions.

2. A process for producing a fine-textured pigment adapted for direct use as a mix-in pigment in coating composition vehicles, said pigment being substantially free of particles of 5 microns or greater size and substantially all of the particles of which pass through a 325 mesh screen, comprising intimately associating with a previously ground, finished, calcined, white, inorganic pigment from about .03% to about 4.5% of a polar non-polar compound, dispersing the resultantly treated pigment in a gaseous suspending medium, and thereafter subjecting the resultant suspension to classification treatment to remove the grit, aggregate and coarse particles from the desired fine-textured material and recovering said fine-textured material.

3. A process for producing a fine-textured pigment adapted for direct use as a mix-in pigment in coating composition vehicles, said pigment being substantially free of particles of 5 microns or greater size and substantially all of the particles of which pass through a 325 mesh screen, comprising intimately associating with a previously ground, finished, calcined, white, inorganic pigment from about .15% to about 2.2% of a polar non-polar compound, dispersing the resultantly treated pigment in a gaseous suspending medium, and thereafter subjecting the resultant suspension to classification treatment to remove the grit, aggregate and coarse particles from the desired fine-textured material and recovering said finer fractions.

4. A process for producing a fine-textured pigment adapted for direct use as a mix-in pigment in coating composition vehicles, said pigment being substantially free of particles of 5 microns or greater size and substantially all of the particles of which pass through a 325 mesh screen, comprising intimately associating with a previously ground, finished, calcined, white, inorganic pigment from about 0.20% to about 0.9% of a polar non-polar compound, dispersing the resultantly treated pigment in a gaseous suspending medium, and thereafter subjecting the resultant suspension to classification treatment to remove the grit, aggregate and coarse particles from the desired fine-textured material and recovering said fine-textured material.

5. A process for producing a fine-textured pigment product adapted for direct use as a mix-in pigment, said pigment being substantially free of particles of 5 microns or greater size and substantially all of the particles of which pass through a 325 mesh screen, comprising coating a previously ground, finished form of said pigment with a layer of a polar non-polar compound at least 1 molecule thick, dispersing the resultantly treated pigment in a gaseous suspending medium, and thence subjecting the resultant suspension to classification to remove the grit, aggregate and coarse particles present therein and recover the desired, fine-textured material substantially freed from said grit and aggregates.

6. A proces for producing a fine-textured, calcium sulfate-extended titanium oxide pigment adapted for direct use as a mix-in product, comprising coating said pigment after calcination grinding and finishing with a layer of polar non-polar compound substantially 1 molecule thick, dispersing the resultantly treated pigment in air, and then subjecting the resultant pigment dispersion to classification to remove coarse, gritty particles therefrom and to recover the desired fine-textured material.

7. A process for producing a fine-textured, calcium sulfate-extended titanium oxide pigment adapted for use as a direct mix-in product in paints, enamels and finishes, comprising intimately associating with said pigment after calcination grinding and finishing from about 0.20% to about 0.9% of a polar non-polar compound, dispersing the resultantly treated pigment in a gaseous suspending medium, and thereafter subjecting the resultant suspension to classification treatment to remove the grit, aggregate and coarse particles from the desired fine-textured material.

8. A process for producing a fine-textured pigment product adapted for direct use as a mix-in pigment in coating compositions, said pigment being substantially free of particles of 5 microns or greater size and substantially all of the particles of which pass through a 325 mesh screen, comprising intimately associating a minor amount of oleic acid with said pigment subsequent to calcination, grinding and finishing, dispersing the resultantly treated pigment in a gaseous medium, and thence subjecting the resultant dispersion to classification treatment to remove the coarser pigment particles from the finer fractions thereof, and recovering said finer fractions.

9. A process for producing a fine-textured pigment product adapted for direct use as a mix-in pigment in coating compositions, comprising intimately associating a minor amount of naphthenic acid with said pigment subsequent to calcination, grinding and finishing, dispersing the resultantly treated pigment in a gaseous medium, and thence subjecting the resultant dispersion to classification treatment to remove the coarser pigment particles from the finer fractions thereof, and recovering said finer fractions.

10. A process for producing a fine-textured pigment product adapted for direct use as a mix-in pigment in coating compositions, said pigment being substantially free of particles of 5 microns or greater size and substantially all of the particles of which pass through a 325 mesh screen, comprising intimately associating a minor amount of cocoanut oil fatty acid with said pigment subsequent to calcination and finishing, dispersing the resultantly treated pigment in a gaseous medium, and thence subjecting the resultant dispersion to classification treatment to remove the coarser pigment particles from the finer fractions thereof, and recovering said fine fractions.

11. A process for producing a fine-textured pigment substance adapted for direct use as a mix-in pigment in coating composition vehicles, said pigment being substantially free of particles of 5 microns or greater size and substantially all of the particles of which pass through a 325 mesh screen, comprising treating said substance subsequent to calcination, grinding and finishing with an amount of a polar non-polar compound sufficient to coat each pigment particle with a monomolecular layer of said compound, dispersing the resultantly treated pigment in a gaseous medium and thereafter subjecting the resultant dispersion to classification treatment to remove the coarser pigment particles from the desired finer fractions and recovering said finer fractions.

12. A process for producing a fine-textured pigment adapted for direct use as a mix-in pigment in coating composition vehicles, said pigment being substantially free of particles of 5 microns or greater size and substantially all of the particles of which pass through a 325 mesh screen, comprising treating a pigment substance subsequent to calcination, grinding and finishing with an amount of oleic acid sufficient to coat each particle of said pigment with a monomolecular layer of said oleic acid, dispersing the resultantly treated pigment in a gaseous medium and thence subjecting the resultant dispersion to classification treatment to recover the finer pigment fractions from the coarser particles thereof.

13. A process for producing a fine-textured, calcium sulfate-extended titanium oxide pigment adapted for use as a direct mix-in product in paints, enamels and finishes, comprising intimately associating from about .03 to 4.5% of naphthenic acid with said pigment subsequent to its calcination, grinding and finishing, dispersing the resulting treated pigment in a gaseous medium, and thence subjecting the resulting dispersion to classification treatment to remove the coarser pigment particles from the finer fractions thereof and recovering said finer fractions.

14. A process for producing a fine-textured, calcium sulfate-extended titanium oxide pigment adapted for use as a direct mix-in product in paints, enamels and finishes, comprising intimately associating from about 0.15 to 2.2% of naphthenic acid with said pigment subsequent to its calcination, grinding and finishing, dispersing the resulting treated pigment in a gaseous medium, and thence subjecting the resulting dispersion to classification treatment to remove the coarser pigment particles from the finer fractions thereof and recovering said finer fractions.

15. A process for producing a fine-textured, calcium sulfate-extended titanium oxide pigment adapted for direct use as a mix-in product in paints, enamels and finishes, which comprises intimately associating a minor amount of naphthenic acid with said pigment upon its discharge from a calciner, thereafter dispersing the treated pigment in a gaseous medium, and thence subjecting the resulting dispersion to classification treatment to remove the coarser pigment particles from the finer fractions thereof and recovering said finer fractions for use as a mix-in product.

16. A process for producing a fine-textured pigment product adapted for direct use as a mix-in pigment in coating compositions without recourse to grinding in the vehicle employed therein, said pigment being substantially free of particles of 5 microns or greater size and substantially all of the particles of which pass through a 325 mesh screen, which comprises dispersing in a gaseous medium a finished form of said pigment in the presence of from about .15% to about 2.2%, based on the pigment, of a polar non-polar compound, and then subjecting the resulting pigment dispersion to air classification to remove coarse gritty particles therefrom and to recover the desired, fine-textured material.

17. A process for producing a fine-textured pigment product adapted for direct use as a mix-in pigment in coating compositions, said pigment being substantially free of particles of 5 microns or greater size and substantially all of the particles of which pass a 325 mesh screen, comprising intimately associating with a previously ground, finished form of said pigment from about .03 to about 4.5% of a polar, non-polar compound having the formula:

wherein R is from the group consisting of an aliphatic and cyclic radical having at least 5 carbon atoms, and X is from the group consisting of hydrogen and a metal, dispersing the resulting treated pigment in a gaseous medium, and thence subjecting the resulting dispersion to classification treatment to remove the coarser pigment particles from the finer fractions thereof, and recovering said finer fractions as the mix-in product.

18. A process for producing a fine-textured calcium sulfate-extended titanium oxide pigment adapted for direct use as a mix-in product in paints, enamels and finishes, said pigment being substantially free of particles of 5 microns or greater size and substantially all of the particles of which pass a 325 mesh screen, comprising intimately associating with a previously ground, finished form of said pigment from about .15 to about 2.2% of a polar, non-polar compound having the formula wherein R is from the group consisting of an aliphatic and cyclic radical having at least 5 carbon atoms, and X is from the group consisting of hydrogen and a metal, dispersing the resulting treated pigment in a gaseous medium, and thence subjecting the resulting dispersion to classification treatment to remove the coarser pigment particles from the finer fractions thereof, and recovering said finer fractions as the mix-in product.

CHARLES EDWARD BERRY.

CERTIFICATE OF CORRECTION.

Patent No. 2,274,521. February 24, 1942.

CHARLES EDWARD BERRY.

It is hereby certified that error appears in the printed specification of the above numbered patent requiring correction as follows: Page 9, second column, line 7, claim 10, after "calcination" insert --, grinding--; and line 12, same claim, for "fine" read --finer--; and that the said Letters Patent should be read with this correction therein that the same may conform to the record of the case in the Patent Office.

Signed and sealed this 5th day of May, A. D. 1942.

Henry Van Arsdale,
Acting Commissioner of Patents.

(Seal)